United States Patent
Zhang et al.

(10) Patent No.: US 9,854,515 B2
(45) Date of Patent: Dec. 26, 2017

(54) ENERGY SAVING OPERATIONS FOR WIRELESS NETWORKS

(71) Applicant: Avago Technologies General IP (Singapore) Pte. Ltd., Singapore (SG)

(72) Inventors: Lili Zhang, Beijing (CN); Tero Heikki Matti Henttonen, Espoo (FI); Haiming Wang, Beijing (CN); Wei Hong, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 138 days.

(21) Appl. No.: 14/650,233

(22) PCT Filed: Dec. 7, 2012

(86) PCT No.: PCT/CN2012/086156
§ 371 (c)(1),
(2) Date: Jun. 5, 2015

(87) PCT Pub. No.: WO2014/086035
PCT Pub. Date: Jun. 12, 2014

(65) Prior Publication Data
US 2015/0319689 A1    Nov. 5, 2015

(51) Int. Cl.
*H04W 24/02*    (2009.01)
*H04W 28/08*    (2009.01)
(Continued)

(52) U.S. Cl.
CPC ....... *H04W 52/0206* (2013.01); *H04W 24/02* (2013.01); *H04W 40/005* (2013.01); *Y02B 60/50* (2013.01)

(58) Field of Classification Search
None
See application file for complete search history.

(56) References Cited

U.S. PATENT DOCUMENTS 8,700,059 B1 *  4/2014  Vivanco ............ H04W 52/0216
                                                          455/435.2
8,996,042 B1 *  3/2015  Hannigan ............. H04W 68/04
                                                          455/458
(Continued)

FOREIGN PATENT DOCUMENTS

CN        101471931       7/2009
WO        WO-2011/021975  2/2011
WO        WO-2012/149968  11/2012

OTHER PUBLICATIONS

International Search Report for PCT Application No. PCT/CN2012/086156 dated Sep. 5, 2013.
(Continued)

*Primary Examiner* — Duc Duong
(74) *Attorney, Agent, or Firm* — Foley & Lardner LLP

(57) ABSTRACT

A network controlling entity in a heterogeneous or local area network (such as a macro eNB) selects a set of network access nodes that share a common wake-up area code WUAC. The network controlling entity selects a transmission entity such as a motile terminal/UE and directs it to wirelessly transmit a signal on a given radio resource. The network controlling entity also informs each network access node within the set of the given radio resource on which they should listen for the signal. In various embodiments the network access nodes within the set can choose whether or not to listen for the signal and thus choose whether they will wakeup, or they can reply to the signal with a request for wakeup confirmation. In this manner WUAC-specific sets of small cells can be awakened only when needed for traffic offloading and thereby saving energy.

20 Claims, 5 Drawing Sheets

(51) Int. Cl.
H04W 52/02 (2009.01)
H04W 40/00 (2009.01)

(56) References Cited

U.S. PATENT DOCUMENTS

| | | | | |
|---|---|---|---|---|
| 2009/0122737 | A1* | 5/2009 | Twitchell, Jr. | H04W 56/002 370/311 |
| 2011/0098050 | A1* | 4/2011 | Eipe | H04W 88/16 455/450 |
| 2011/0098051 | A1* | 4/2011 | Kamalaraj | H04W 24/00 455/450 |
| 2012/0302230 | A1* | 11/2012 | Lim | H04W 76/021 455/422.1 |
| 2013/0079006 | A1* | 3/2013 | Cho | H04W 8/06 455/435.1 |
| 2013/0137434 | A1* | 5/2013 | Godin | H04W 8/24 455/436 |
| 2013/0229959 | A1* | 9/2013 | Ghosh | H04W 74/08 370/311 |
| 2014/0044058 | A1* | 2/2014 | El-Saidny | H04W 72/048 370/329 |
| 2014/0155078 | A1* | 6/2014 | Balageas | H04W 24/02 455/452.1 |
| 2014/0342736 | A1* | 11/2014 | Zhang | H04W 60/00 455/435.1 |

OTHER PUBLICATIONS

Written Opinion for for PCT Application No. PCT/CN2012/086156 dated Sep. 5, 2013.
International Preliminary Report on Patentability for PCT Application No. PCT/CN2012/086156 dated Jun. 9, 2015.

* cited by examiner

WakingUpAreaCode information element

```
-- ASN1START

WakingUpAreaCode ::=              BIT STRING (SIZE (16))

-- ASN1STOP
```

| IE/Group Name | Presence | Range | IE Type and Reference | Semantics Description |
|---|---|---|---|---|
| CHOICE *Cause Group* | M | | | |
| >*Radio Network Layer* | | | | |
| >>Radio Network Layer Cause | M | | ENUMERATED ( Handover Desirable for Radio Reasons, Time Critical Handover, Resource Optimisation Handover, Reduce Load in Serving Cell, Partial Handover, Unknown New eNB UE X2AP ID, Unknown Old eNB UE X2AP ID, Unknown Pair of UE X2AP ID, HO Target not Allowed, $TX2_{RELOCoverall}$ Expiry, $T_{RELOCprep}$ Expiry, Cell not Available, No Radio Resources Available in Target Cell, Invalid MME Group ID, Unknown MME Code, Encryption And/Or Integrity Protection Algorithms Not Supported, ReportCharacteristicsEmpty, NoReportPeriodicity, ExistingMeasurementID, Unknown eNB Measurement ID, Unspecified, ..., Load Balancing, Handover Optimisation, Value out of allowed range, Waking-Up Rejection Cause ) | |
| >*Transport Layer* | | | | |
| >>Transport Layer Cause | M | | ENUMERATED (Transport Resource Unavailable, Unspecified, ...) | |
| >*Protocol* | | | | |
| >>Protocol Cause | M | | ENUMERATED (Transfer Syntax Error, Abstract Syntax Error (Reject), Abstract Syntax Error (Ignore and Notify), Message not Compatible with Receiver State, Semantic Error, Unspecified, Abstract Syntax Error (Falsely Constructed Message),...) | |
| >*Misc* | | | | |
| >>Miscellaneous Cause | M | | ENUMERATED (Control Processing Overload, Hardware Failure, O&M Intervention, Not enough User Plane Processing Resources, Unspecified,...) | |

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 .. <maxCellineNB> | | | EACH | ignore |
| >>Cell ID | M | | ECGI 9.2.14 | Id of the source cell | – | – |
| >>UL Interference Overload Indication | O | | 9.2.17 | | – | – |
| >>UL High Interference Information | | 0 .. <maxCellineNB> | | | – | – |
| >>>Target Cell ID | M | | ECGI 9.2.14 | Id of the cell for which the HII is meant | – | – |
| >>>UL High Interference Indication | M | | 9.2.18 | | – | – |
| >>Relative Narrowband Tx Power (RNTP) | O | | 9.2.19 | | – | – |
| >>ABS Information | O | | 9.2.54 | | YES | ignore |
| >>MLIAC assignment | O | | 9.2.60 | | YES | ignore |
| >>Wakeup Information with WUAC | O | | 9.2.61 | | YES | ignore |
| >>Rejection Indication | O | | 9.2.62 | | YES | ignore |

| IE/Group Name | Presence | Range | IE type and reference | Semantics description |
|---|---|---|---|---|
| Invoke Indication | M | | ENUMERATED (ABS Information, WUAC assignment, Wakeup Information with WUAC, Rejection Indication...) | – |

602

ENERGY SAVING OPERATIONS FOR WIRELESS NETWORKS

RELATED APPLICATIONS

This application is the U.S. National Stage of and claims priority to and the benefit of International Patent Application Number PCT/CN2012/086156, filed Dec. 7, 2012. The entire contents of the foregoing are hereby incorporated herein by reference for all purposes.

TECHNICAL FIELD

The exemplary and non-limiting embodiments of this invention relate generally to wireless communication systems, methods, devices and computer programs, and more specifically relate to energy savings in network access nodes via sleep and awake modes for those access nodes.

BACKGROUND

While energy consumption in wireless cellular network nodes has been a topic of interest for some time, and has recently taken on a higher priority in the telecommunication community. When analyzing the energy consumption of wireless access networks it becomes clear that in order to reduce the total energy usage it is prudent to focus on the most abundant network nodes, namely the base stations (BS). See for example an undated paper by Pål Frenger, Peter Moberg, Jens Malmodin, Ylva Jading and Istvan Gódor entitled REDUCING ENERGY CONSUMPTION IN LTE WITH CELL DTX (*IEEE Vehicular Technology Conference*; Spring 2011, pp. 1-5). Two driving forces behind improving energy efficiency for mobile network operation are a) some network operators are experiencing increased electricity costs for network operation, and b) there is an increased awareness of how energy use relates to green-house gas emissions and global warming. To this end and others there is a new research initiative called EARTH (Energy Aware Radio and neTwork tecHnologies) in which industry and academia have joined to address energy consumption in mobile systems. See for example the EARTH project website (http://www.ict-earth.eu/36.927).

For network energy savings it is prudent to consider how cellular networks are expected to be deployed in the future. One deployment likely to gain wide adoption over time is to use a large number of small cells, which aid in satisfying the increasing data rate requirements in cellular networks; for general background on this see for example the textbook by W. Webb entitled WIRELESS COMMUNICATIONS: THE FUTURE (published by John Wiley & Sons; 2007). The shorter coverage ranges (tens or a few hundreds of meters) of small cells lend themselves well to the use of higher frequency bands that are suited for high data rates. Some companies have proposed that for LTE Release 12 there will be an enhanced Local Area (eLA) small cell as the mainstream scenario. FIG. 1 depicts such a small cell deployment with many small cells densely deployed in a quite high frequency for offloading data (sometimes they are referred to as for providing enhanced services), and a macro cell is deployed for mobility (basic cellular coverage) in a lower frequency.

3GPP TS 36.927, V10.1.0 entitled "Potential solutions for energy saving for E-UTRAN" summarizes four different proposals for energy savings in cellular networks. In a first approach when the coverage cell detects a high load, it uses a proprietary algorithm to decide which hotspot cells should be activated and relies on pre-defined low-load periods' for each neighbor hotspot cell. This appears to be a quite complex algorithm and not able to adapt to the network's fast offloading needs. In a second approach when the coverage cell detects a high load it can request some dormant hotspot cells to switch on their listening capability to perform and report Interference over Thermal (IoT) measurements. IoT is well known in the art, defined in 3GPP TR 36.214 V10.1.0 (2011-09) which is a technical report on potential solutions for energy saving for E-UTRAN. This appears to wake up some cells unnecessarily, limiting its energy saving effectiveness.

When the Coverage cell detects a high load in the third approach, it can request some dormant hotspot cells to transmit a pilot/reference signal for a short time interval which is termed a probing interval. After this interval, all or some hotspot cells will return to the dormant mode while the coverage cell configures its UEs to perform reference signal measurements from the hotspot cells during this interval and report their feedback. This is seen to be similar to the approach defined for mobility purposes in 3GPP TS 36.331. The coverage cell will then determine from the measurement results which hotspot cells should be switched on. This technique also appears to unnecessarily wake up some small cells, and additionally the user equipment (UE) needs to perform measurements at certain intervals which further reduces the overall energy savings.

And finally when the coverage cell detects a high load in the fourth approach, it can use a combination of UE locations, cell locations, and cell radii/transmit powers to decide which hotspot cells should be switched on. There is also a timer value in the activation request message sent from the coverage cell which the selected hotspot cells use to verify at its expiry if the condition required for staying on has been met and if not the hotspot cell will autonomously turn off. This approach does not appear very practical for current cell deployments.

SUMMARY

The foregoing and other problems are overcome, and other advantages are realized, by the use of the exemplary embodiments of this invention.

In a first exemplary aspect of the invention there is a method for operating a network controlling entity in a heterogeneous or local area network. In this embodiment the method comprises:

selecting at least one set of network access nodes, each set sharing a common wake-up area code;

selecting a transmission entity and directing the selected transmission entity to wirelessly transmit a signal on a given radio resource; and informing each network access node within the selected set or sets of the given radio resource on which they should listen for the signal.

In a second exemplary aspect of the invention there is an apparatus comprising at least one processor; and at least one memory including computer program code. This apparatus is for operating a network controlling entity in a heterogeneous or local area network, and the apparatus may be the whole network controlling entity (such as a macro eNB/macro cell access node) or one or more components thereof. In this embodiment the at least one memory and the computer program code is configured, with the at least one processor, to cause the apparatus at least to:

select at least one set of network access nodes, each set sharing a common wake-up area code;

select a transmission entity and direct the selected transmission entity to wirelessly transmit a signal on a given radio resource; and inform each network access node within the selected set or sets of the given radio resource on which they should listen for the signal.

In a third exemplary aspect of the invention there is a computer readable memory tangibly storing a set of computer instructions that is executable by at least one processor. In this embodiment the set of executable computer instructions comprises:

code for selecting at least one set of network access nodes, each set sharing a common wake-up area code;

code for selecting a transmission entity and directing the selected transmission entity to wirelessly transmit a signal on a given radio resource; and code for informing each network access node within the selected set or sets of the given radio resource on which they should listen for the signal.

Any of the above aspects can further include the following implementation specifics. In one non-limiting embodiment, directing the selected transmission entity to wirelessly transmit the signal comprises sending dedicated signaling allocating the given radio resource to the transmission entity which is a user equipment (UE).

In another non-limiting embodiment the network access nodes are small cell access nodes and there is a further step of configuring different sets of small cell access nodes, each within a coverage area of a macro cell access node, with a different wake-up area code, and wherein the method is executed by the macro cell access node. This embodiment may further be characterized by the macro cell access node selecting the at least one set of network access nodes based on volume and location of traffic offload demand.

In a further non-limiting embodiment, informing each network access node within the selected set or sets of the given radio resource comprises sending to each respective network access node within the selected set or sets:

Wakingup Information which specifies the given radio resource;

an indication of the wake-up area code assigned to the respective network access node; and a Wakingup Threshold for comparing by the respective network access node against the signal received by the respective network access node on the given radio resources.

The embodiment immediately above may be further characterized in that the Wakingup Information comprises at least one parameter that is specific for the wake-up area code assigned to the respective network access node and the selected transmission entity (a scrambling code in the non-limiting example below).

In a still further non-limiting embodiment the macro cell access node further receives from at least one of the respective (small cell) network access nodes a rejection cause indication in reply to informing that respective network access node of the given radio resource; and thereafter based on the rejection cause indication, the macro cell access node updates a map of small cell access nodes comprising a waking up area to reflect that the respective network access node is not awakened. This map may be stored in the local memory of the macro cell access node in various forms, for example a table of the small cell eNBs with their assigned wakeup area code and further relative positions of all the small cell nodes relative to one another.

There are two implementations in the examples below for how the access nodes wakeup. In a first implementation, those (small cell) network access nodes which were informed of the designated radio resource choose themselves whether or not to wake up. In this case the small cell nodes which choose to wake up may send to the macro access node a reply to the signal they received from the transmission entity. Based on those replies to the signal that the macro access node receives, it determines which of the small cell network access nodes within the selected set or sets have chosen to awaken.

In a second implementation the small cells that are to awaken still send a reply to the transmission entity's signal and the macro access node is the one that gets these replies. But in this case the replies from the small cell access nodes are seeking confirmation that they should wakeup. Based on these replies to the transmission entity's signal, the macro access node chooses which of the network access nodes (those which require wakeup confirmation) from which a reply was received should awaken, and then signals a wakeup confirmation only the chosen network access nodes. In this manner the macro eNB can exclude from the awakening certain small cell eNBs which themselves have decided they are available for awakening, since only those small cell eNBs that get a confirmation back from the macro cell will awaken. This is useful for example if the offload traffic is not following the geographic layout of the WUACs.

These and other embodiments are detailed further below with more particularity.

BRIEF DESCRIPTION OF THE DRAWINGS

FIG. 3 is a table representing a WakingUpAreaCode information element (IE) according to exemplary but non-limiting embodiments of these teachings.

FIG. 4 is a table representing information carried in a Cause IE which is modified according to exemplary but non-limiting embodiments of these teachings to add the shaded waking up rejection cause.

FIG. 5 is a table representing information sent by an eNB to a neighboring eNB to transfer load and interference coordination information, and is modified by the shaded elements pertaining to waking up according to exemplary but non-limiting embodiments of these teachings.

FIG. 6 is a table representing information carried in an Invoke Indication IE which is modified according to exemplary but non-limiting embodiments of these teachings to add the shaded additional information concerning wake-up for the eNB receiving this IE to return back to the sender of this IE.

DETAILED DESCRIPTION

Figure 1:
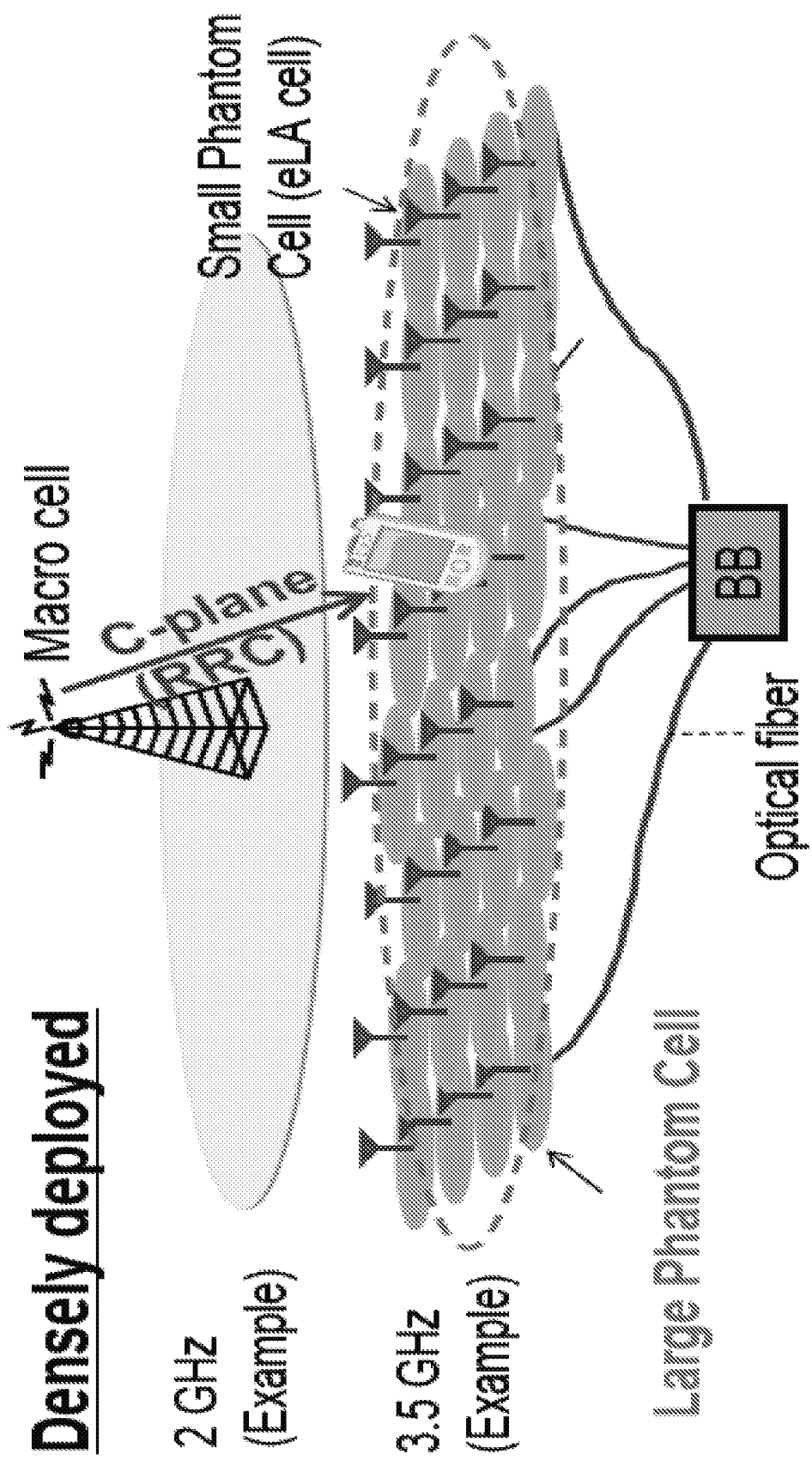
FIG. 1 is a schematic plan view of a cellular radio network with many densely packed small cells operating at a high radio frequency all under the coverage area of a macro cell operating at a lower radiofrequency, and is a proposed radio network deployment for 3GPP Release 12 that illustrates one example of a radio deployment in which these teachings may be practiced to advantage.

The background section above noted that employing energy-efficient techniques in the network is especially effective for a large-scale dense deployment of small cells in a heterogeneous network (HetNet) or in a location area (LA) network.

On the surface it may appears possible to re-use the conventional paging scheme used to wake user equipments (UEs). For example there can be a paging from eNB to eNB to wake-up the page-receiving entity/eNB and some downlink indication to inform the eNB when it should be in a listening mode to monitor whether it receives a page to wake it up. Other literature on energy savings on the network side suggest a UE can send signaling pro-actively for the eNB to wake-up. The problem with these paging type approaches is that it is not specified which eNB should be in listening mode, nor do they specify corresponding ways to inform this type of e-NBs.

It is of course preferred that the network should not have any coverage holes. Consider an example where there are two neighboring small cells eNB1 and eNB2. When a UE moves from eNB 1 coverage to eNB 2 coverage, even though eNB 2 is in sleeping mode the macro eNB that may accomplish the larger coverage might be in active mode. In this example, it may not be essential to always activate eNB2. The teachings below provide a solution for dealing with the above problem of sleeping versus active small-cell eNBs in an energy efficient way.

Because different entities can perform some of the functions and signaling detailed in the below examples, first let us define terms. There is a network controlling entity which decides and controls which small cell eNBs are to be awakened. As a functionally descriptive name this entity may also be referred to as a waker-eNB since it selects which other (small cell) eNBs are to be awakened. In the non-limiting example below this network controlling entity/waker-eNB is the macro cell eNB shown at FIG. 1, which has a wide coverage area that encompasses most if not all of the coverage areas of the small cell eNBs. There are some exceptions, such as where one or more small cell coverage areas are used to extend the range of the macro cell, but in typical densely packed small cell deployments the small cell coverage areas will be within the confines of the macro cell eNB coverage area.

There are also network access nodes which refer to any network entity that can have a direct radio link with a UE or other mobile user device. The small cell eNBs as well as the macro cell eNB are each a network access node, any of which can be implemented as a conventional base station, or as a remote radio head (RRH), or as a relay (among other embodiments known in the wireless cellular arts). As a functionally descriptive name the network access nodes which are selected by the controlling network entity/waker-eNB may also be referred to as listening-eNBs since they listen for signaling to be awakened according to the teachings below. Though in some cases detailed below by example they may not actually awaken in response to receiving this signaling.

And finally in the examples below there is a transmission entity. This transmission entity is selected by the controlling network entity/waker-eNB as its vehicle to send the wake-up signaling to the network access nodes that the controlling network entity/waker-eNB has selected for wake-up. The controlling network entity/waker-eNB is not very restricted in whom it may select as the transmission entity; it could be a UE, it could be a small cell eNB that is in an active state, or it could be some other entity altogether. It is assumed in the below examples that any UE serving this purpose will have continuous coverage with the macro eNB, at least for control plane/radio resource control (RRC) signaling as FIG. 1 illustrates. There is similar control signaling means available between the macro eNB and the small cell eNBs such as for example an X2 or other interface which may be wired or wireless depending on the specifics of the network deployment.

Figure 2:
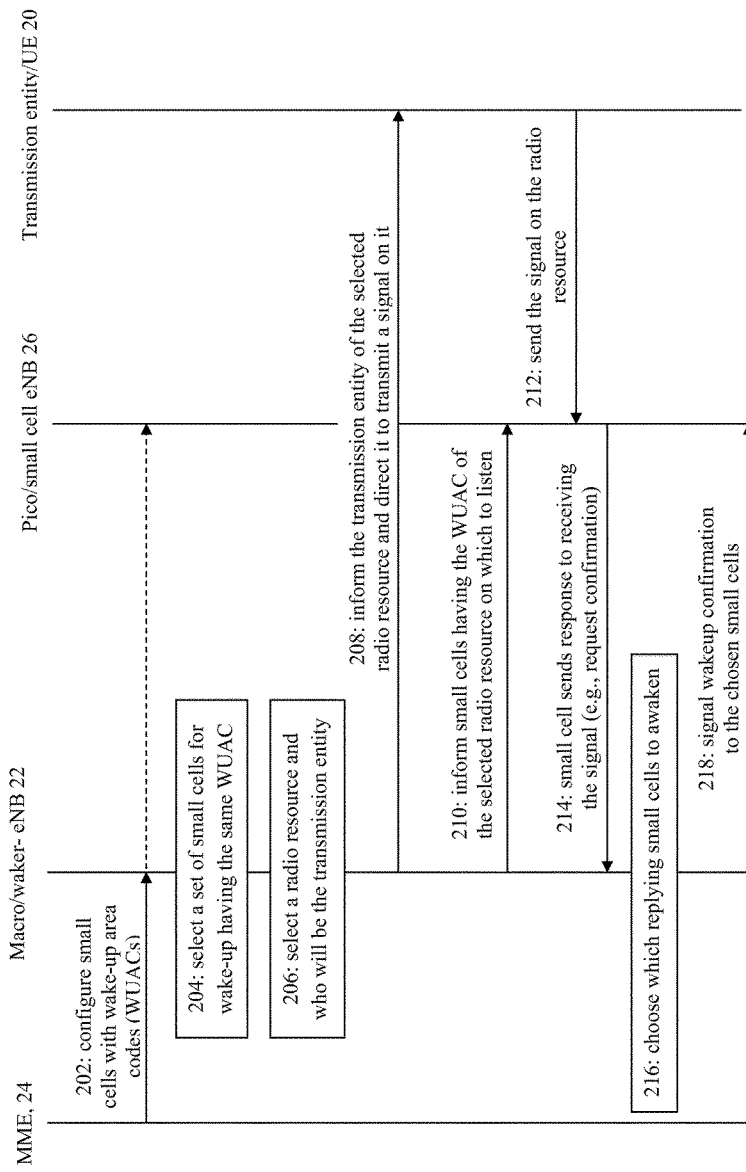
FIG. 2 is an example signaling diagram which gives a broader context in which the information elements (IEs) of FIGS. 3, 4A-B and 5 may be signaled in a specific but non-limiting implementation.

In broad terms, embodiments of these teachings provide a means of ordering the transmission entity to send a signal to be listened to by several of the network access nodes (the small cell eNBs), which then send their response back to the originating network controlling entity/waker-eNB. FIG. 2 is a signaling diagram that illustrates some of the more salient features of a particular embodiment of these teachings, including signaling between various entities and certain decisions made by the macro eNB/waker-eNB. FIG. 1 illustrates only one small cell eNB 26 which is representative of all small cell eNBs under the same macro eNB 22 and also having the same waking-up area code.

FIG. 2 is a signaling and decision diagram that may also be considered a logic flow diagram which may be considered to illustrate the operation of a method, and a result of execution of a computer program stored in a computer readable memory, and a specific manner in which components of an electronic device are configured to cause that electronic device to operate. The various blocks and signaling shown in FIG. 2 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

At block 202 of FIG. 2 a network entity configures the small cell eNBs with a waking-up area code (WUAC). Conceptually the WUAC may be considered as similar to tracking area code, and the term WAUC may be considered broad enough to encompass tracking area codes for the case these teachings are implemented in a tracking area type network and the existing tracking area codes are used in place of separate WUACs. FIG. 1 illustrates that a mobility management entity MME 24 decides the WUAC assignments and configures the small cell eNBs via signaling sent by the macro eNB 22. But in other deployments there may be some other network entity (higher in the network hierarchy than the macro eNB 22) other than an MME 24 that makes these assignments, or it may be a support entity such as an operations and maintenance (OAM) entity. The dashed line from the macro eNB 22 to the small cell eNB 26 indicates pass-through signaling by the macro eNB 22, and so in the illustrated case both the MME 24 and the macro eNB 22 may be considered as configuring the small cell eNBs 26 with their respective WUAC. Whichever network node makes the WUAC assignments also provides to the macro eNB 22 a list of all eNBs in its coverage area that belong to the same WUAC.

In different deployments of these teachings, each small cell eNB 26 under coverage of a single macro eNB 22 has one and only one WUAC; or some may be configured with two or more WUACs such as those small cell eNBs that positionally border another WUAC group. The small cell eNBs having the same WUAC may be a geographically contiguous group, all being closely packed and adjacent to another small cell eNB with the same WUAC. In other implementations certain small cell eNBs may be given the same WUAC based on historical traffic patterns, such as where the need for traffic offloading often follows a line of small cell eNBs through the macro cell coverage area and those small cell eNBs would then be given the same WUAC. For the examples below assume each small cell eNB is configured with one and only one WUAC.

Now having the list of which small cell eNBs have which WUACs, the macro/waker-eNB 22 selects a set of small cell eNBs for wake-up at decision block 204, and the set is defined by a WUAC. The macro/waker-eNB 22 can choose multiple sets with different WUACs for simultaneous or near-simultaneous wakeup signaling, but for simplicity of this explanation assume it selects only one WUAC-specific set of small cells. Decision block 206 finds the macro-waker-eNB 22 choosing a transmission entity in its control (a UE 20 served by the macro/waker-eNB in the non-limiting FIG. 1 example) which is to send an uplink signal with some predefined transmission resources (such as for example time, frequency, channel coding, scrambling code, carrier, and physical resource blocks). Decision block 206 indicates the transmission resource simply as a radio resource.

Next, at message 208 the macro/waker-eNB 22 informs the transmission entity/UE 20 that it chose of the radio resources it selected, and tasks that transmission entity to send a signal on those radio resources. Message 210 is the macro/waker-eNB 22 signaling to the (small cell) eNBs in the same WUAC to inform them of the radio resources it selected at decision block 206, and directing or requesting that they listen on those radio resources (for the signal that the transmission entity is to send). At this point those small cell eNBs with the selected WUAC are listener-eNBs.

Then the transmission entity/UE 20 sends at message 212 the signal on the designated radio resources and the listener-eNB 26 listens for and receives it. In an embodiment the listener-eNBs are not required to listen; they may choose to try to receive the signaling 212 according to the signaled transmission resources, and their choice may be governed by some to predefined rules. Some listener-eNBs may choose to reject the request 210 and not send any feedback at message 214, or they may send an explicit reject message in response to receiving message 210 whether or not they choose to receive the signal 212 on the designated radio resources.

The predefined rules which determine the response 214 that the listener-eNBs send in response to receiving the signal 212 on the designated radio resources can be explicit such as rules set forth in a governing radio standard, or the rules may be implicit. In any case the listener-eNBs will then choose whether to send a response 214 back to the macro/waker-eNB 22. In a particular embodiment the response 214 will include the respective listener-eNB's decision whether to wake up, whether the respective listener-eNB requests a confirmation of the wake-up, and what was the measured signal from the listened-to transmission 212.

When the macro/waker-eNB 22 receives the response(s) from the listener-eNB(s), it determines whether to send a reply back to the respective listener-eNB(s). Depending on the granularity of information the macro/waker-eNB 22 has concerning traffic to be offloaded and location of the UE(s) which have the traffic, it may choose to wake up only select ones of the listener-eNBs that respond 214 with a confirmation request. Or it may choose to wake up all of the listener-eNBs that send a positive response 214. Decision block 216 reflects this choice by the macro/waker-eNB 22, and message 218 is the message that the macro/waker-eNB 22 sends to those listener-eNBs that it chose at decision block 216. The message 218 may be a wake-up confirmation in response to the replies 214 that are requests for wake-up confirmation, or for example message 218 may have more detailed information about the expected traffic for the respective listener-eNBs.

Now consider some non-limiting implementation details for a macro/waker-eNB 22 to request a listener eNB 26 (or a group of listener-eNBs) to listen to a specific uplink waking-up transmission 212 at a specified time and respond 214 back. The waker-eNB 22 then orders a transmission source/entity (such as one of its served UEs 20) to send 212 a signal that will be listened to by another eNB 26 (or multiple eNBs), and based on the signal they received 212 from the UE 20 will then decide what kind of response 214 is sent back to the waker-eNB 22.

The group of small cells having a same WUAC may be considered to form an uplink waking-up area. The serving eNB 22 may order (or request in other implementations) a UE 20 to send a uplink waking-up transmission 212 that can be decoded by nearby listening small cells 26. The serving cell 22 also informs 210 these small cells 26 of the transmission resources (including the timing) used for this transmission 212, and the small cell eNBs that belong to this area shall wake up to listen to. The small cells 26 which receive this uplink signal 212 can then send a response 214 back to the originating eNB 22, and this response 214 can include rejecting the request 210. Meanwhile, the eNB 26 with the same code as the indicated wake-up area code (WUAC) shall have the right to send a rejection command and an indication of the related cause of the rejection in response to the request 210, based on its own situation. This would allow the waking-eNB 22 to update what will be the true waking-up area.

Consider further the uplink wake-up area code (WUAC) for the small cell eNBs 26. When receiving the request 210, from another eNB in the same WUAC (or from the macro eNB 22 as in the above example), the small cell eNBs that belong to this area shall wake up to listen to the indicated uplink waking-up signaling 212 which is sent by the transmission source 20. The WUAC is established such as for example via signaling from the macro eNB 22 or by a network OAM entity in the above examples, and the eNBs that belong to the indicated WUAC will wake up temporarily to detect the uplink waking-up signal 212 from transmission source 20.

In one embodiment the initiating macro eNB 22 shall use a WUAC assignment command to define the WUAC that a small cell eNB 26 belongs to. FIG. 3 is a table representing a WakingUpAreaCode information element (IE) that can be used for this purpose, such as by including it in the message 202 of FIG. 1. The WUAC IE is used to identify a tracking area within the scope of a public land mobile network (PLMN), similar to the tracking areas (TAs) defined in 3GPP TS 24.301. In this or another embodiment the initiating eNB 22 shall coordinate and instruct the relevant small cell eNB nodes with the mapped WUAC to wake up in some prespecified timing. For example, the macro eNB 22 can do this by sending Wakingup Information with the WUAC command to request potential cells to do the measurement of the UE waking-up signal 212 in the specified timing. In another embodiment the initiating macro eNB 22 shall send a Wakingup Threshold to the small cell eNBs that have the indicated WUAC so that the target eNB 26 may judge whether to wake up based on the rule which in this case might be whether the sensed signal to interference+noise ratio (SINR) of the uplink waking-up signal 212 the small cell eNB 26 received is larger than the indicated Wakingup Threshold. And in another embodiment the UE 20 or other transmission entity may be instructed to send a signal 212 according to the explicitly/implicitly indicated (at message 208) time/frequency/transmission radio resources as noted above, and may in this embodiment also be requested to listen to a response 214 from the small cell eNBs 26 according to the signaled explicit/implicit time/frequency/transmission radio resources.

Above it was mentioned that the target (small cell) eNB 26 with the mapped WUAC may have the right to reject the upcoming waking-up request. This may be implemented for example by the target eNB 26 sending a Rejection Indication command over its interface with the initiating (macro/waker) eNB 22. In one particular embodiment the target eNB 26 may send a related Rejection Cause together with the Rejection Indication command. FIG. 4 illustrates a cause information element (IE) that may be used for this purpose in one non-limiting embodiment. The cause IE is used to indicate the reason for a particular event for the whole protocol. Modifications according to these teachings to a conventional cause IE are shown by shading at reference number 402. Specifically, in the Radio Network Layer Cause field of FIG. 4 there is added an enumerated reason that the sending eNB 26 may select, which informs the recipient of this cause IE of the reason that the sending eNB 26 rejected to wakeup request 210.

Another non-limiting example of how the relevant wake-up information may be communicated among the nodes is shown at the load information IE of FIG. 5 which is modified according to these teachings as shown by shading. Specifically, field 502 is a WUAC assignment field which is how the network higher layers or management layers can inform (for example, through the macro eNB 22) the small cell eNBs of their respectively assigned WUAC. Field 504 is a wake-up information field which may inform the recipient small cell 26 about the radio resources on which it is requested to listen for the signal from the third party transmission entity (UE 20 in the above example). And field 506 is a rejection indication field which the small cell eNB 26 can use to inform the macro/waker eNB 22 that it will not be listening for the signal as requested, and in some embodiments this field 506 may also carry a cause code to inform the macro/waker eNB 22 of the reason for the rejection.

Not every instance of this load information IE will have the above described information in all three of those fields 502, 504 and 506. For example, field 502 may be utilized when the load information IE is used in message 202 of FIG. 2; field 504 may be utilized when the load information IE is used in message 210 of FIG. 2; and field 506 may be utilized when the load information IE is used in message 214 of FIG. 2 or in another rejection message not shown in FIG. 2 which the small cell eNB 26 sends in reply to receiving message 210.

The invoke indication IE shown by example at FIG. 6 represents a third non-limiting example of how the relevant wake-up information may be communicated among the nodes, with modifications according to these teachings again being shown by shading. In this case there is additional options 602 made available for the sending eNB to add in the invoke indication field. Specifically, those options are similar to the three specific added fields 502, 504, 506 described for FIG. 5 for WUAC assignment, wake-up information, and rejection indication (and possibly also rejection cause).

The invoke indication 1E of FIG. 6 may in an embodiment be used in conjunction with the IEs described above for FIGS. 3-5, in that the invoke indication IE of FIG. 6 can be used to indicate to the recipient what type of information that recipient should send to the sender of the invoke indication IE of FIG. 6. In this regard the FIG. 6 is an IE requesting information, and the requested information is provided by the IEs of FIG. 3-5. For example, a small cell eNB 26 may recognize that it does not have an assigned WUAC and send the invoke indication IE of FIG. 6 to the macro eNB 22 to request it, after which the macro eNB 22 responds with the WakingUpAreaCode IE of FIG. 3. After seeing it has failed to properly decode message 210 from the macro/waker eNB 22 a small cell eNB 26 may send the invoke indication IE of FIG. 6 to request both the wakeup information (radio resources, including timing) and the WUAC assigned to itself, after which the macro eNB 22 responds by re-sending message 210 which in this re-transmission will include the WUAC. As a third example if the small cell eNB 26 fails to send a response 214 to the macro/waker eNB 22 the macro/waker eNB 22 can use the invoke indication IE of FIG. 6 to request a rejection indication and cause.

The above embodiments of these teachings can be used in conjunction with other network-based energy saving techniques. For example, the macro cell may select, according to the traffic situation and/or location situation, between the normal sense activation of small cells, or the specific activation using the UE waking-up method described herein.

The assignment of the WAUC can be done by the macro cell, which uses its knowledge of all the small cell WUAC assignments to decide which small cells belong to the wake-up area that are to measure the UE waking-up signal. Assignment of the WUAC to the small cells may be done via a WUAC assignment command that defines the WUAC that a small cell eNB belongs to, and this command may be signaled over an inter-eNB interface such as the X2 interface in the LTE/LTE-A systems, or it may be signaled over an air interface as with a wireless backhaul-type arrangement.

The macro eNB 22 has control of the radio resources over the whole larger macro cell, at least at the frequencies that have not been allocated for the small cells. In this regard the macro cell can configure the radio frames/subframes to be used by the UE 20 (or other third party transmission entity) for the uplink waking up signal transmission. The macro cell 22 can configure the UE 20 for this transmission via dedicated signaling, and then inform the small cells that belong to the indicated WUAC of what are the configured radio resources on which they should listen.

In one specific but non-limiting embodiment, the uplink signal that the UE 20 transmits may be using some different radio characteristic than normal, such as for example a different scrambling code. This is because there will be several cells listening to the UE's signal, and so the scrambling code used by the UE for this waking up transmission could be unique to the WUAC and UE. The macro/waker eNB 22 can provide to the appropriate small cell eNBs 26 information about the appropriate scrambling code as part of the radio resources information it sends them in message 210 of FIG. 2.

Based on the macro/maker-eNB's evaluation of the traffic situation, the macro cell shall send Wakingup Information with WUAC command and possibly also the Wakingup Threshold (message 210 of FIG. 2) to request potential cells to do the measurement of the UE waking up signal 212 in the specified timing. Then the small cell eNB(s) with the mapped WUAC shall measure the UE's uplink waking-up signal 212, and compare that measured received signal with the indicated Wakingup Threshold. If the SINR sensed by the small cell eNB is larger than the Wakingup Threshold, in an embodiment of these teachings the small cell eNB shall wakeup according to its own situation in the specified timing. In this embodiment the target (small cell) eNB may instead reject to listen to the UE uplink waking-up signaling 212 according to its own local situation. The target eNB in this case shall send the related Rejection Cause together with the rejection indication, and the waking-up area may be updated and revised subsequently by the macro/waker eNB 22 based on the indicated rejection cause.

Certain embodiments of these teachings provide technical effects and advantages, including that the waking-up techniques detailed by example above identifies the potential response eNBs 26 more exactly than prior art solutions, based on the defined waking-up area. This more precise identification of the small cells to waken consequently improves the network side (small cell) energy efficiency. Additionally, these techniques enable the small cell eNB to determine itself whether to activate or not, which further increases the eNB energy efficiency based on the small cell eNB's own situation.

Figure 7:
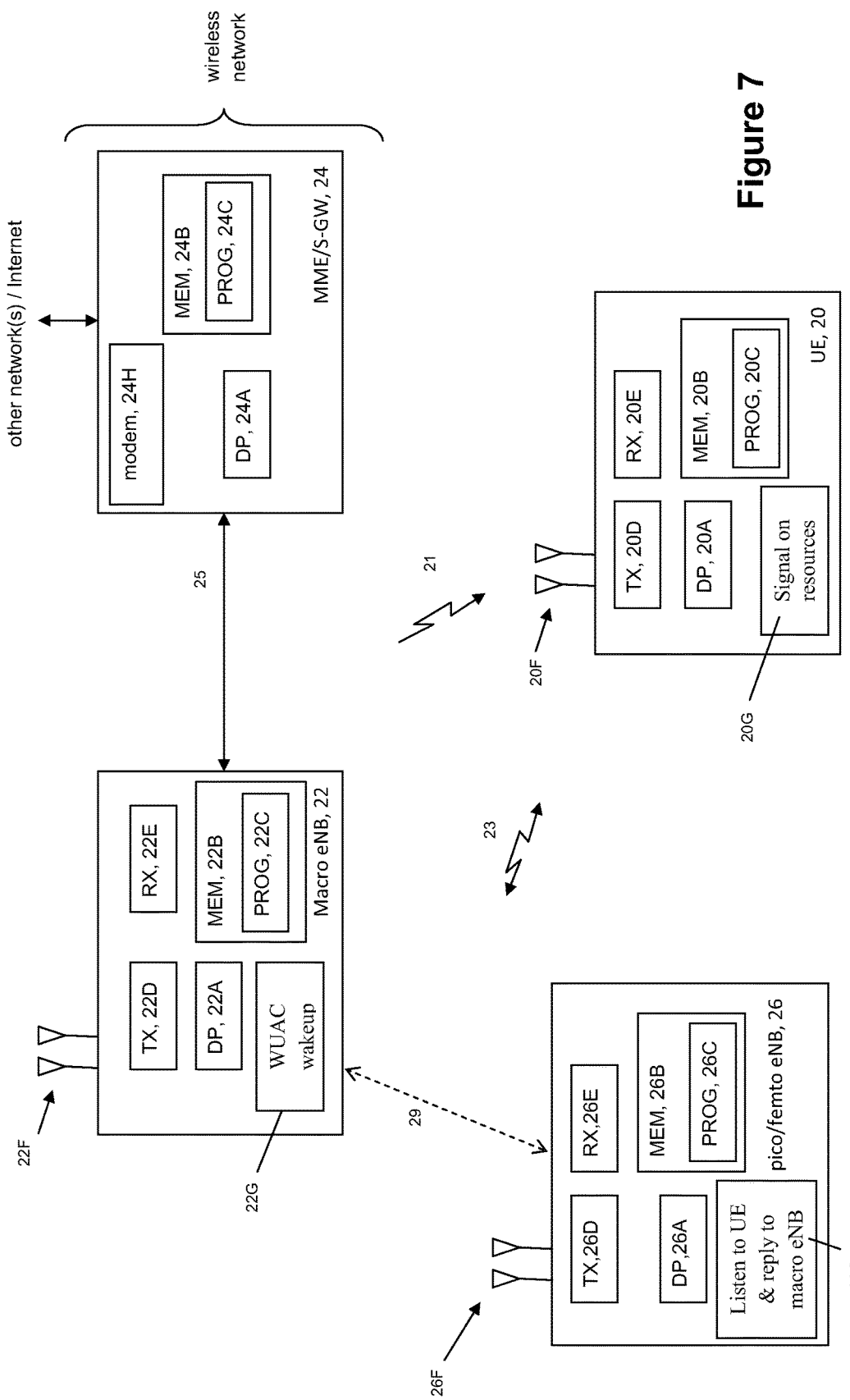
FIG. 7 is a simplified block diagram of some of the devices shown at FIG. 1 which are exemplary electronic devices suitable for use in practicing the exemplary embodiments of this invention.

Reference is now made to FIG. 7 for illustrating a simplified block diagram of various electronic devices and apparatus that are suitable for use in practicing the exemplary embodiments of this invention. In FIG. 7 there is a macro network access node/waker-eNB 22 coupled via an X2 interface 29 to a small cell network access node eNB 26 (shown as a pico or femto eNB), which are adapted for communication over respective wireless links 21, 23 with an apparatus 20 such as a mobile terminal or termed more generally as a user equipment UE. The macro eNB 22 may be further communicatively coupled via link 25 to further networks (e.g., a publicly switched telephone network PSTN and/or a data communications network/Internet), such as via a higher network node such as a mobility management entity/serving gateway MME/S-GW 24 in the case of the LTE/LTE-A system. Link 25 can also be a communication link to an OAM server within the wireless network which makes the WUAC assignments for distribution by the macro eNB 22.

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the macro eNB 22 and at least unidirectional communication with the pico eNB 26 via one or more antennas 20F. Within the memory 20B of the UE 20 is also a computer program 20G for transmitting the signal (for receipt by the pico eNB 26) on the designated/allocated radio resources as directed by the macro eNB 22 in the above example embodiments.

The macro eNB 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with its associated user devices (not shown) via one or more antennas 22F and a modem. The macro eNB 22 has stored in its memory at 22G software to execute the WUAC-based wakeup procedures as detailed in particular by the above non-limiting examples.

The pico eNB 26 is similarly functional with processing means such as at least one data processor (DP) 26A, storing means such as at least one computer-readable memory (MEM) 26B storing at least one computer program (PROG) 26C, and communicating means such as a transmitter TX 26D and a receiver RX 26E for bidirectional wireless communications with its associated user devices (if any) via one or more antennas 22F and a modem. The pico eNB 26 has stored in its memory at 26G software to direct it to listen for the signal from the UE 20 on the resources indicated to it by the macro eNB 26, and to either reject the listening request or measure the signal and report results to the macro eNB 22 as detailed in particular by the above non-limiting examples.

For completeness the MME/S-GW 24 is also shown to include a DP 24A, and a MEM 24B storing a PROG 24C, and additionally a modem 24H for communicating with at least the first/macro eNB 22 and possibly also the pico eNB 26. While not particularly illustrated for the UE 20 or eNBs 22, 26, those devices are also assumed to include as part of their wireless communicating means a modem which may in one exemplary but non limiting embodiment be inbuilt on an RF front end chip so as to carry the respective TX 20D/22D/26D and RX 20E/22E/26E. The MME 24, or alternatively a similarly configured OEM server, can decide the WUAC assignments as noted above.

At least one of the PROGs 22C/22G, 26C/26G, 20C/20G in the macro and eNB 22 and in the pico eNB 26 and in the UE 20, is assumed to include program instructions that, when executed by the associated DP 22A, 26A, 20A, enable the device to operate in accordance with the exemplary embodiments of this invention as detailed more fully above. In this regard the exemplary embodiments of this invention may be implemented at least in part by computer software stored on the MEM 22B, 26B, 20B which is executable by the DP 22A, 26A, 20A of the respective devices 22, 26; 20, or by hardware; or by a combination of tangibly stored software and hardware (and tangibly stored firmware). Electronic devices implementing these aspects of the invention need not be the access node 22, 26, or UE 20, but exemplary embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card (or any combinations of these components).

Various embodiments of the UE 20 can include, but are not limited to: cellular telephones; data cards, USB dongles, personal portable digital devices having wireless communication capabilities including but not limited to laptop/palmtop/tablet computers, digital cameras and music devices, and Internet appliances. Various embodiments of the eNBs 22, 26 may be a network base station/access node, a remote radio head, a relay, or one or more components of any of those implementations.

Various embodiments of the computer readable MEM 20B, 22B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 20A, 22A, 26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE and LTE-A systems, it should be appreciated that the exemplary embodiments of this invention are not limited for use with only this one particular type of wireless communication system, and that they may be used to advantage in other wireless communication systems such as for example UTRAN or other radio access technologies that now or in the future utilize a managed-interference subframe arrangement to implement a heterogeneous network.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method for operating a network controlling entity in a heterogeneous or local area network, the method comprising:
    selecting at least one set of network access nodes, each set sharing a common wake-up area code;
    selecting a transmission entity and directing the selected transmission entity to wirelessly transmit a signal on a given radio resource; and
    informing each network access node within the selected at least one set of network access nodes, the given radio resource on which they should listen for the signal, by sending:
    wakingup information which specifies the given radio resource; and
    a wakingup threshold for comparing by the respective network access node against the signal received by the respective network access node on the given radio resource.

2. The method according to claim 1, wherein directing the selected transmission entity to wirelessly transmit the signal comprises sending dedicated signaling allocating the given radio resource to the transmission entity which is a user equipment.

3. The method according to claim 1, wherein the network access nodes are small cell access nodes and the method further comprises configuring different sets of small cell access nodes, each within a coverage area of a macro cell access node, with a different wake-up area code, and wherein the method is executed by the macro cell access node.

4. The method according to claim 3, wherein the macro cell access node selects the at least one set of network access nodes based on volume and location of traffic offload demand.

5. The method according to claim 1, wherein informing each network access node within the selected at least one set of network access nodes the given radio resource comprises sending to each respective network access node within the selected at least one set of network access nodes,
    an indication of a wake-up area code assigned to the respective network access node.

6. The method according to claim 5, wherein the wakingup information comprises at least one parameter that is specific for the wake-up area code assigned to the respective network access node and the selected transmission entity.

7. The method according to claim 1, the method further comprising:
    receiving from at least one of the respective network access nodes a rejection cause indication in reply to the said informing of the respective network access node of the given radio resource; and thereafter
    based on the rejection cause indication, updating a map of small cell access nodes comprising a waking up area to reflect that the respective network access node is not awakened.

8. The method according to claim 1, wherein the method further comprises receiving, by the network control entity, from the selected at least one set of network access nodes, replies to the signal, and after informing each network access node within the selected at least one set of network access nodes the given radio resource on which they should listen for the signal:
    based on the received replies to the signal, determining which of the network access nodes within the selected at least one set of network access nodes are chosen to awaken.

9. The method according to claim 1, wherein the method further comprises receiving, by the network control entity, from the network access nodes within the selected at least one set of network access nodes which require wakeup confirmation, replies to the signal, and after informing each network access node within the selected at least one set of network access nodes the given radio resource on which they should listen for the signal:
    based on the received replies to the signal, choosing which of the network access nodes from which a reply was received should awaken; and
    signaling a wakeup confirmation only the chosen network access nodes.

10. An apparatus for operating a network controlling entity in a heterogeneous or local area network, the apparatus comprising:
    at least one processor; and
    at least one memory including computer program code;
    in which the at least one memory and the computer program code is configured, with the at least one processor, to cause the apparatus at least to:
    select at least one set of network access nodes, each set sharing a common wake-up area code;
    select a transmission entity and direct the selected transmission entity to wirelessly transmit a signal on a given radio resource; and
    inform each network access node within the selected at least one set of network access nodes, the given radio resource on which they should listen for the signal, by sending:
    wakingup information which specifies the given radio resource; and
    a wakingup threshold for comparing by the respective network access node against the signal received by the respective network access node on the given radio resources.

11. The apparatus according to claim 10, wherein the selected transmission entity is directed to wirelessly transmit the signal via dedicated signaling allocating the given radio resource to the transmission entity which is a user equipment.

12. The apparatus according to claim 10, wherein the network access nodes are small cell access nodes,
    and the at least one memory and the computer program code is configured with the at least one processor to cause the apparatus at least to further configure different sets of small cell access nodes, each within a coverage area of a macro cell access node, with a different wake-up area code, and wherein the network controlling entity comprises the macro cell access node.

13. The apparatus according to claim 12, wherein the at least one set of network access nodes is selected based on volume and location of traffic offload demand.

14. The apparatus according to claim 10, wherein each respective network access node within the selected at least one set of network access nodes is informed of the given radio resource by a message that comprises
an indication of a wake-up area code assigned to the respective network access node.

15. The apparatus according to claim 14, wherein the wakingup information comprises at least one parameter that is specific for the wake-up area code assigned to the respective network access node and the selected transmission entity.

16. The apparatus according to claim 10, wherein the at least one memory and the computer program code is configured with the at least one processor to cause the apparatus at least to further:
receive from at least one of the respective network access nodes a rejection cause indication in reply to the said informing of the respective network access node of the given radio resource; and thereafter
based on the rejection cause indication, update a map of small cell access nodes comprising a waking up area to reflect that the respective network access node is not awakened.

17. The apparatus according to claim 10, wherein the at least one memory and the computer program code is configured with the at least one processor to cause the apparatus to receive replies to the signal, from the selected at least one set of network access nodes, and after informing each network access node within the selected at least one set of network access nodes the given radio resource, to at least further:
based on the received replies to the signal, determine which of the network access nodes within the selected set or sets have chosen to awaken.

18. The apparatus according to claim 10, wherein the at least one memory and the computer program code is configured with the at least one processor to cause the apparatus to receive replies to the signal, from the network access nodes within the selected at least one set of network access nodes which require wakeup confirmation, and after informing each network access node within the selected at least one set of network access nodes the given radio resource, to at least further:
based on the received replies to the signal, choose which of the network access nodes from which a reply was received should awaken; and
signal wakeup confirmation only to the chosen network access nodes.

19. A computer readable memory tangibly storing a set of computer instructions that is executable by at least one processor, the set of computer instructions comprising:
code configured for selecting at least one set of network access nodes, each set sharing a common wake-up area code;
code configured for selecting a transmission entity and directing the selected transmission entity to wirelessly transmit a signal on a given radio resource; and
code configured for informing each network access node within the selected at least one set of network access nodes, the given radio resource on which they should listen for the signal, by sending:
wakingup information which specifies the given radio resource; and
a wakingup threshold for comparing by the respective network access node against the signal received by the respective network access node on the given radio resources.

20. The computer readable memory according to claim 19, wherein the code configured for directing the selected transmission entity to wirelessly transmit the signal comprises code configured for sending dedicated signaling allocating the given radio resource to the transmission entity which is a user equipment.

* * * * *